(No Model.)
G. K. WHEELER.
INSULATOR.
No. 448,395. Patented Mar. 17, 1891.
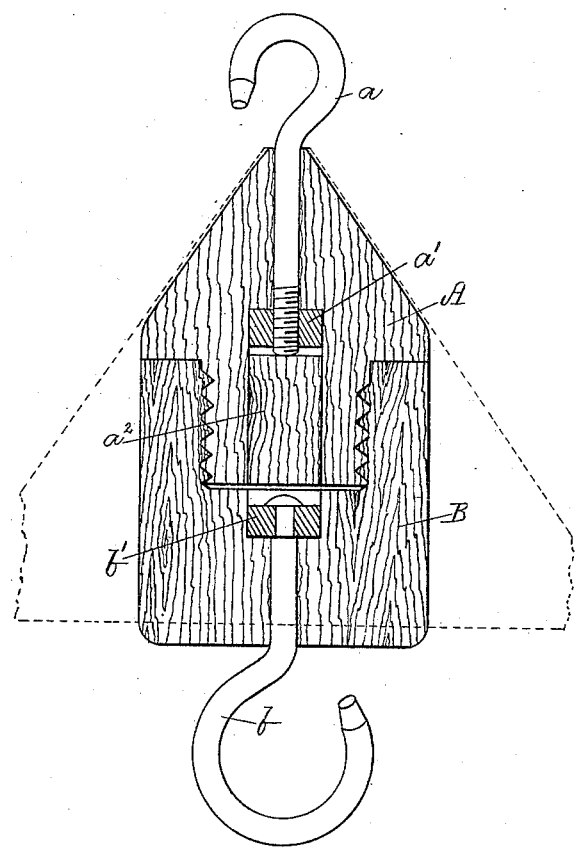
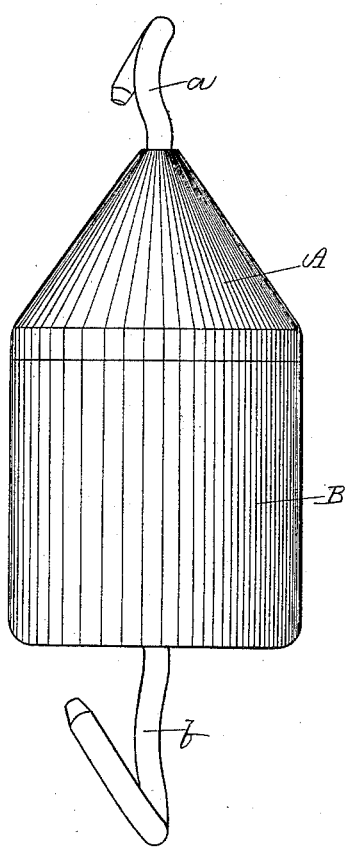
Witnesses.
Lauritz W. Möller
John R. Snow
Inventor.
George K. Wheeler
by his attorneys
Maynard & Beech

UNITED STATES PATENT OFFICE.

GEORGE K. WHEELER, OF CHICAGO, ILLINOIS.

INSULATOR.

SPECIFICATION forming part of Letters Patent No. 448,395, dated March 17, 1891.

Application filed November 21, 1890. Serial No. 372,186. (No model.)

*To all whom it may concern:*

Be it known that I, GEORGE K. WHEELER, of Chicago, Cook county, and State of Illinois, have invented a new and useful Insulator, of which the following is a specification, reference being had to the accompanying drawings, making a part hereof, in which—

Figure 1 is a longitudinal section, and Fig. 2 a side elevation, of one of my insulators.

My invention is a cone insulator consisting of two non-conducting portions, one of which is cone-shaped to receive a hood, which are connected by male and female threads, and each carrying a metal hanger.

In the drawings the two non-conducting portions are marked A and B. A metal hanger $a$, or other means for connecting the insulator with its support, is connected to the part A by means of a nut or washer $a'$, which fits into a bore in part A and by which the shank of hanger $a$ is held, and a like metal hanger $b$, for connecting the ear of a trolley-wire with the insulator or for other similar purpose, is in like manner connected by washer $b'$ with the part B. The plug $a^2$ prevents all possibility of the nuts or washers $a'$ and $b'$ and hangers $a$ and $b$ from coming into contact; but obviously the air-space which this plug $a^2$ occupies answers as an insulation whether the plug $a^2$ be used or not, and that plug is a matter of extra caution, but valuable where the hanger $a$ is likely in use to be forced toward the hanger $b$.

The dotted lines in Fig. 1 indicate the usual weather-proof hood.

What I claim as my invention is—

1. The cone-insulator above described, consisting of the non-conducting parts A and B, screwed together and provided with the hangers $a$ and $b$, one of the parts being conical at one end to receive a hood, all substantially as described.

2. In combination, the non-conductors A and B, secured together, the hangers $a$ and $b$, and the plug $a^2$ between the inner ends of the hangers, all substantially as described.

GEORGE K. WHEELER.

Witnesses:
F. J. WILLSON,
H. J. SINCLAIR.